United States Patent [19]

Dean et al.

[11] Patent Number: 4,873,471

[45] Date of Patent: Oct. 10, 1989

[54] HIGH FREQUENCY BALLAST FOR GASEOUS DISCHARGE LAMPS

[75] Inventors: Thomas E. Dean, Cookeville; William H. Henrich, Sparta, both of Tenn.; David M. Fischer, Waltham; Lawrence J. Stratton, Lexington, both of Mass.; Herbert E. Pietsch, Cookeville, Tenn.

[73] Assignee: Thomas Industries Inc., Louisville, Ky.

[21] Appl. No.: 106,180

[22] Filed: Oct. 8, 1987

Related U.S. Application Data

[63] Continuation-in-part of Ser. No. 845,853, Mar. 28, 1986, abandoned.

[51] Int. Cl.$^4$ .............................................. H05B 41/36
[52] U.S. Cl. .................................... 315/308; 315/307; 315/DIG. 7
[58] Field of Search ................. 315/307, 308, DIG. 2, 315/DIG. 7, 199, 158

[56] References Cited

U.S. PATENT DOCUMENTS

| | | | |
|---|---|---|---|
| 2,928,994 | 3/1960 | Widakowich | 315/205 |
| 3,047,789 | 7/1962 | Lowry | 363/96 |
| 3,072,822 | 1/1963 | Holmes | 315/107 |
| 3,265,930 | 8/1966 | Powell, Jr. | 315/209 R |
| 3,449,629 | 6/1969 | Wigert et al. | 315/151 |
| 3,541,421 | 11/1970 | Buchman | 320/1 |
| 3,611,021 | 4/1970 | Wallace | 315/239 |
| 3,648,106 | 3/1972 | Engel et al. | 315/291 |
| 3,662,216 | 5/1972 | Hildebrant | 315/205 |
| 3,681,654 | 8/1972 | Quinn | 315/151 |
| 3,684,919 | 8/1972 | Cramer | 315/194 |
| 3,719,858 | 3/1973 | Gilbreath | 361/55 |
| 3,821,601 | 6/1974 | Kappenhagen et al. | 315/311 |
| 3,879,652 | 4/1975 | Billings | 361/100 |
| 3,885,197 | 5/1975 | Moses | 315/194 |
| 3,890,537 | 6/1975 | Park et al. | 315/208 |
| 3,890,562 | 6/1975 | West | 323/235 |
| 3,904,922 | 9/1975 | Webb et al. | 315/151 |
| 3,936,726 | 2/1976 | Kelley, Jr. | 323/237 |

(List continued on next page.)

FOREIGN PATENT DOCUMENTS

0013866 8/1980 European Pat. Off. .

(List continued on next page.)

OTHER PUBLICATIONS

"Estimation of HPS Lamp Voltage Rise as a Function of Ballast Characteristic Curve Parameters", by Ward in the Journal of IES, Oct. 1983, pp. 157–161.

"High Frequency Operation Producing Double Hot Spots on Electrodes for Fluorescent Lamps", by Yuhara et al, presented at the Illuminating Engineering Society Annual Conference in Boston, Massachusetts, Aug. 17–21, 1986.

"High Frequency Characteristics of Fluorescent Lamps up to 500 KHZ", by Hammer, presented at the Annual IES Conference in Boston, Massachusetts, on Aug. 17–21, 1986.

"F40 Fluorescent Lamp Considerations for Operation at High Frequency", by Hammer et al, presented at the IES Conference, Jul. 21–25, 1985, pp. 63–73.

*Primary Examiner*—Robert L. Griffin
*Assistant Examiner*—T. Salindong

[57] ABSTRACT

An electronic frequency inverter circuit receives input electrical power at a lower frequency and energizes a load circuit including gaseous discharge lamps in a range of higher frequencies. First and second semiconductors are operated alternatively by a logic circuit in current mode control such that the switches operate at the high frequency range and the frequency of current in the load circuit varies as the magnitude of said source voltage varies. The load circuit has an impedance which varies with frequency such that the peak amplitude of the load current remains substantially constant despite variations in the magnitude of said source voltage to achieve a desirable crest factor for the lamp current. A high current limit circuit rapidly turns off the switches when excessively high current begins to flow through the switches. Low voltage is supplied in port from the high frequency current. Normal operation is ensured during start-up, for reduced line voltage and for a semiconductor chip embodiment.

56 Claims, 4 Drawing Sheets

U.S. PATENT DOCUMENTS

| | | | |
|---|---|---|---|
| 3,969,652 | 7/1976 | Herzog | 315/224 |
| 3,999,100 | 12/1976 | Dendy et al. | 315/308 |
| 4,004,188 | 1/1977 | Cooper | 315/261 |
| 4,042,856 | 8/1977 | Steingerwald | 315/246 |
| 4,060,752 | 11/1977 | Walker | 315/244 |
| 4,127,798 | 11/1978 | Anderson | 315/209 R |
| 4,200,830 | 4/1980 | Oughton et al. | 320/32 |
| 4,210,846 | 7/1980 | Capewell et al. | 315/121 |
| 4,220,896 | 9/1980 | Paice | 315/205 |
| 4,238,710 | 12/1980 | Nelson | 315/307 |
| 4,240,009 | 12/1980 | Paul | 315/224 |
| 4,251,752 | 2/1981 | Stolz | 315/206 |
| 4,253,046 | 2/1981 | Gerhard et al. | 315/224 |
| 4,259,614 | 3/1981 | Kohler | 315/219 |
| 4,277,728 | 7/1981 | Stevens | 315/307 |
| 4,287,468 | 9/1981 | Sherman | 323/322 |
| 4,291,254 | 9/1981 | Arit et al. | 315/240 |
| 4,329,627 | 5/1982 | Holmes | 315/209 R |
| 4,334,183 | 6/1982 | Hauenstein | 323/235 |
| 4,356,433 | 10/1982 | Linden | 315/308 |
| 4,358,716 | 11/1982 | Cordes et al. | 315/306 |
| 4,366,570 | 12/1982 | Bees | 372/70 |
| 4,388,563 | 6/1983 | Hyltin | 315/205 |
| 4,392,086 | 7/1983 | Ide et al. | 315/174 |
| 4,414,493 | 11/1983 | Henrich | 315/308 |
| 4,415,839 | 11/1983 | Lesea | 315/308 |
| 4,435,749 | 3/1984 | Grubbs | 363/58 |
| 4,441,054 | 4/1984 | Bay | 315/219 |
| 4,442,382 | 4/1984 | Fleck | 315/287 |
| 4,453,109 | 6/1984 | Stupp et al. | 315/219 |
| 4,461,980 | 7/1984 | Nilssen | 315/225 |
| 4,463,286 | 7/1984 | Justice | 315/219 |
| 4,464,606 | 8/1984 | Kane | 315/158 |
| 4,471,269 | 9/1984 | Gauser et al. | 315/307 |
| 4,477,748 | 10/1984 | Grubbs | 315/306 |
| 4,484,108 | 11/1984 | Stupp et al. | 315/219 |
| 4,498,031 | 2/1985 | Stupp et al. | 315/307 |
| 4,506,195 | 3/1985 | Elms | 315/205 |
| 4,523,131 | 6/1985 | Zansky | 315/307 |
| 4,525,648 | 6/1985 | De Bijl et al. | 315/224 |
| 4,560,908 | 12/1985 | Stupp et al. | 315/219 |
| 4,585,974 | 4/1986 | Stupp et al. | 315/307 |
| 4,591,963 | 5/1986 | Retotar | 363/17 |
| 4,682,084 | 7/1987 | Kuhnel et al. | 315/309 |

FOREIGN PATENT DOCUMENTS

| | | |
|---|---|---|
| 0048977 | 9/1981 | European Pat. Off. |
| 0081884 | 6/1983 | European Pat. Off. |
| 2110287 | 3/1971 | Fed. Rep. of Germany |
| 2642272 | 9/1976 | Fed. Rep. of Germany |
| 3025487 | 7/1980 | Fed. Rep. of Germany |
| 3312575 | 4/1983 | Fed. Rep. of Germany |
| 3142613 | 5/1983 | Fed. Rep. of Germany |
| 2168892 | 1/1972 | France |
| 2345003 | 2/1977 | France |

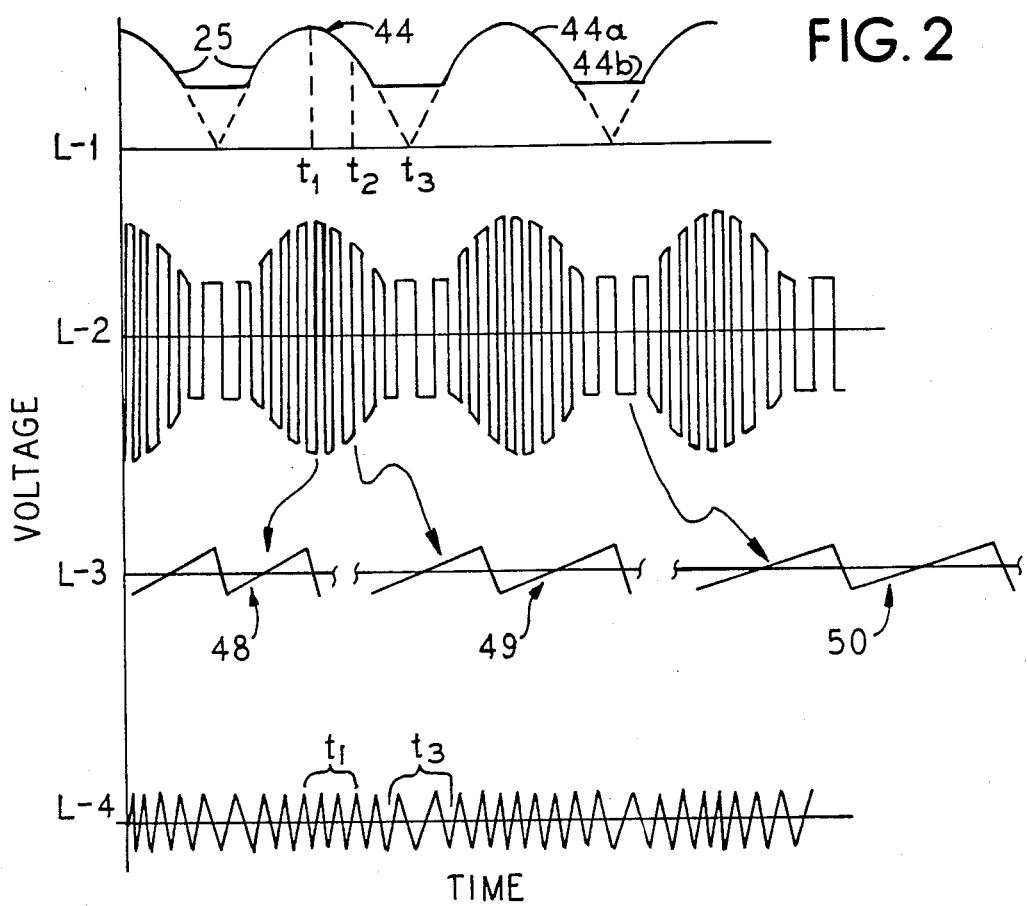
FIG. 2
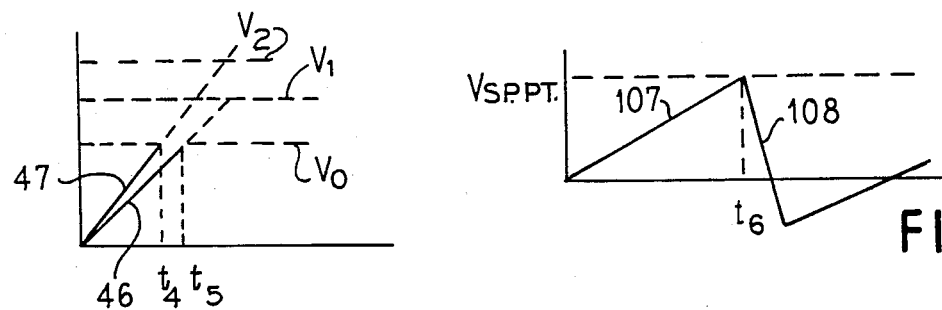
FIG. 3
FIG. 4
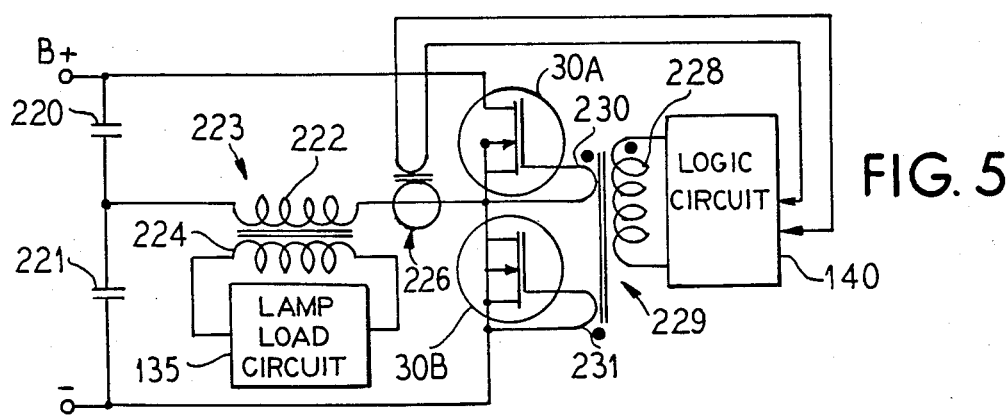
FIG. 5

HIGH FREQUENCY BALLAST FOR GASEOUS DISCHARGE LAMPS

This application is a continuation-in-part of U.S. Ser. No. 845,853, filed Mar. 28, 1986, now abandoned.

BACKGROUND AND SUMMARY OF THE INVENTION

The present invention relates to circuits for energizing gaseous discharge lamps such as fluorescent lamps or high intensity discharge lamps. More particularly, it relates to a ballast using solid state switches and adapted to energize the lamps with high frequency current. Ballast circuits of this type are normally designed to receive energy from a conventional 60 Hz. cycle as is commonly available, and by means of frequency inversion, generate a higher frequency signal (in the range of 25-100 KHz.) to energize the lamps.

The advantages of high-frequency lamp excitation such as more efficient conversion of electrical energy to light output are well-known. However, in the past, and despite the generally accepted principle that high frequency excitation is more efficient, there have been many attempts at high frequency ballasts, but few have met with commercial success. Even those high frequency ballasts which have been commercially produced have one or more disadvantages to them.

Another important factor in evaluating high frequency ballast circuits is the effect that the excitation current has on lamp life. With the rise in energy costs, both ballast manufacturers and lamp manufacturers have, in the last few years, given increased attention to high frequency excitation. Lamp manufacturers have concluded that lamp life may seriously be diminished if the crest factor of the excitation current is not maintained within certain limits.

When, for example, fluorescent lamps were energized by magnetic ballasts at 60 Hz., the crest factor for lamp current (which is defined as the ratio of peak current to RMS current) was approximately 1.41 because 60 Hz. voltage is sinusoidal.

As lamp manufacturers designed lamps for operation at high frequencies, it became clear that the crest factor of lamp current must be maintained within a desired range. It is believed that the heating effect of lamp current is sufficient to heat the cathode of the lamp (in fluorescent lamps) to the point where it is capable of emitting 1.7 times the RMS current. Circuits which exceed a crest factor of 1.7 necessarily exceed the thermionic emission capability of the cathode, and this results in sputtering of the cathode material and shortening lamp life.

Thus, the requirement for achieving a desirable crest factor in high frequency excitation of fluorescent lamps has become an important criteria if a ballast is to receive commercial acceptance. A desired crest factor can be obtained simply by using large inductors and capacitors to filter the line voltage, but the power requirements of these components make them expensive and somewhat bulky, despite operation at higher frequencies.

A high power factor (ratio of wattage to volt amps supplied) is desirable for the electronic ballast. A low power factor (0.9) is usually caused by high line currents or by currents having large peak to RMS ratios. The larger currents (peak or RMS) must have heavier wire to carry it and will allow fewer fixtures on a single breaker circuit. Utilities are often charging a demand fee based on volt-amps supplied because the reactive power is not measured by watt hour meters yet they must still supply it to the customer.

The preferred embodiment of the present invention, thus, is directed to a high frequency inverter ballast for gaseous discharge lamps which achieves a desired crest factor for lamp current and a high power factor with a relatively simple and inexpensive circuit which does not require large magnetic and capacitive components for filtering the DC supply, yet which has many of the desirable characteristics of other solid state ballast circuits.

SUMMARY OF THE INVENTION

The present invention uses first and second power switches which are operated sequentially and mutually exclusively to cause current to flow in the primary winding of a power transformer when conducting. The lamp circuit is connected in the secondary of the power transformer.

Current is regulated in the primary by sensing the current through the power switches and turning off the conducting switch when the sensed current reaches a predetermined value, thereafter turning on the complementary power switch, causing current to flow in the opposite polarity in the secondary of the power transformer. We refer to this as "current mode" operation or regulation. As will be shown, current mode regulation may be employed in various circuit configurations, but the principal advantage is that it maintains the peak amplitude of transformer primary current (and consequently secondary current as well) substantially constant.

The B+ voltage for the inverter circuit is derived from a conventional 60 Hz. source which is full-wave rectified and from a make-up source which supplies a minimum voltage during periods when the full-wave rectified voltage would otherwise reduce to zero. Make-up power is supplied from a capacitor which is charged during voltage peaks.

In a preferred embodiment, the power switches are connected in a push-pull circuit arrangement and operated in current mode regulation. As the B+ voltage increases, the frequency of operation of the power switches (and thus, the frequency of the lamp current) is also increased. Correspondingly, when the B+ voltage goes lower, the frequency of operation decreases. However, the maximum current flowing in the switches remains substantially constant.

The load circuit is designed such that its impedance increases with frequency. When the B+ voltage is at a higher value, the frequency of operation is also higher, and the impedance of the load is greater at the higher frequency. Conversely, when the source voltage is at a lower value the inverter operating frequency is lower and the load impedance is lower. This has the effect of equalizing lamp current and maintaining the peak value of load current at a substantially constant value even though the B+ voltage varies considerably from its peak value to the value of the make-up voltage (which is approximately one-half the peak voltage). A desirable crest factor for lamp current is thereby achieved.

Another feature of the present invention is a circuit provision wherein as power is drawn from the B+ source to be stored in the make-up voltage supply, a signal is generated which increases the current flowing in the power switches so as not to diminish the actual lamp current during periods when energy is being tapped from the primary source and stored in the make-up voltage source.

A minimum frequency oscillator is also incorporated in the circuit so that the minimum operating frequency is held above the frequency for which the transformer saturates and above the human audible range. The minimum frequency oscillator is reset and re-synchronized with the operation of the inverter switches during each half cycle of normal operation so it does not drive the inverter switches during normal operation.

In an alternative embodiment, the minimum frequency oscillator drives the power switches at a minimum frequency referenced to the low voltage, $V_{cc}$.

A further feature of the present invention is that the low voltage, $V_{cc}$, is supplied by a low voltage source circuit connected to the B+ source and by a full wave bridge rectifier which receives high frequency current from a winding on the power transformer. A high current limit circuit is provided to rapidly turn off the switches when excessively high currents begin to flow through the switches. Other circuit features are provided to ensure proper circuit operation during start-up, for reduced line voltages and for a semiconductor "chip" embodiment.

An alternate embodiment is disclosed in which the power switches are connected in a half-bridge circuit configuration with the primary of the power transformer connected in the diagonal of the bridge. This configuration permits the use of power switches with lower voltage ratings and may, therefore, reduce overall costs.

Other features and advantages of the present invention will be apparent to persons skilled in the art from the following detailed description of a preferred embodiment accompanied by the drawing wherein identical reference numerals will refer to like parts in the various views.

BRIEF DESCRIPTION OF THE DRAWING

FIG. 2 is an idealized voltage timing diagram illustrating operation of the system of FIG. 1;

FIGS. 3 and 4 also illustrate voltage waveforms which assist in understanding the operation of the circuit of FIG. 1;

FIG. 5 is a functional block schematic diagram of an alternate circuit incorporating the present invention;

DETAILED DESCRIPTION

Figure 1:
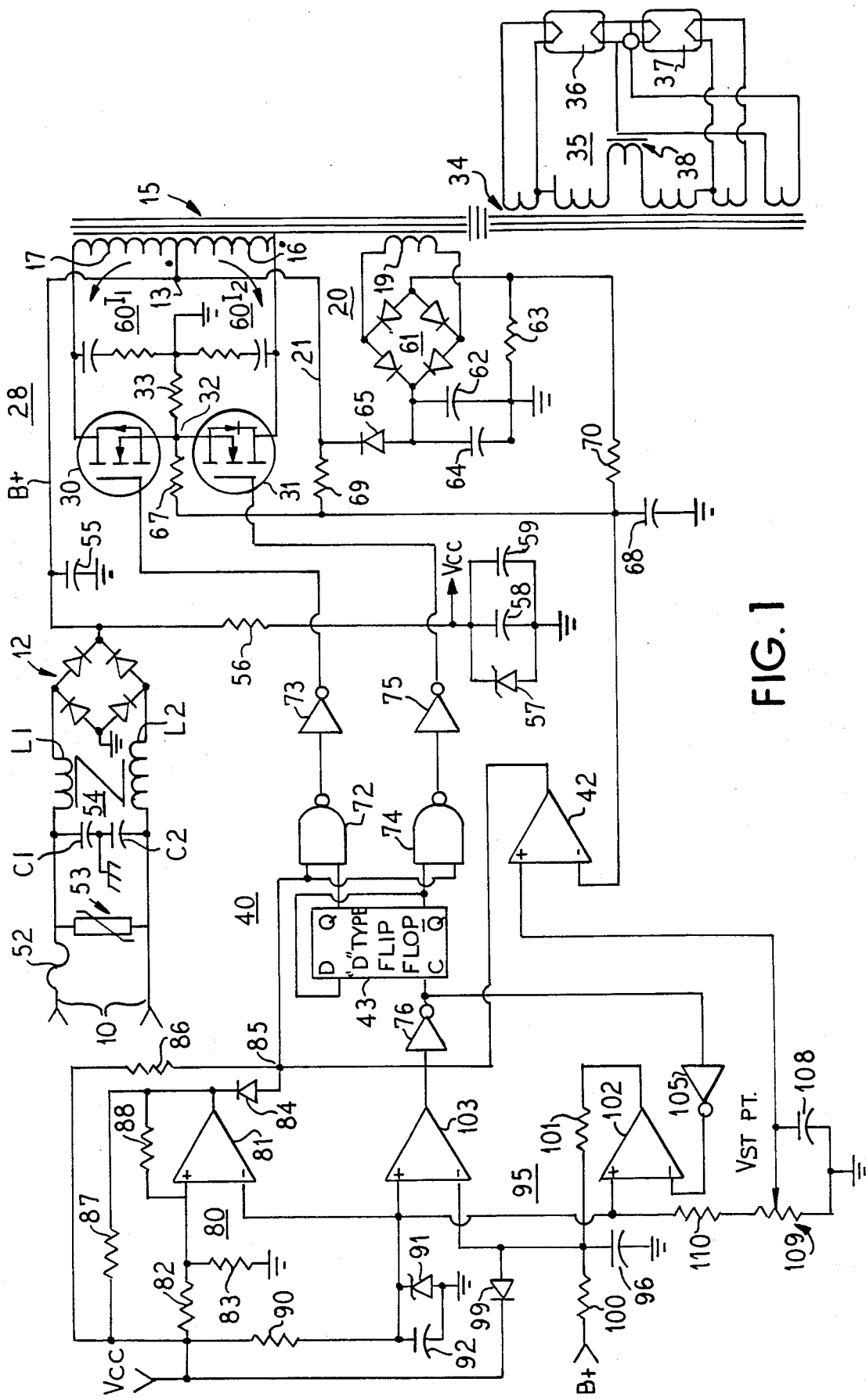
FIG. 1 is a circuit schematic diagram of a ballast circuit incorporating the present invention with portions in functional block form.

Referring first to FIG. 1, and before describing the individual circuit components in detail, an overall description of the principal components and their operation will be given. Input electrical power is received from a conventional source, such as a 60 Hz., 120 V or 277 V power line and coupled to input terminals 10. The input power is fed to a full-wave rectifier bridge circuit generally designated 12, the output of which is fed to an input terminal 13 of a power transformer generally designated 15. Terminal 13 may be a center tap of first and second primary windings designated 16, 17 respectively, as illustrated.

If the only voltage fed to the terminal 13 (called the B+ or source voltage) were a full-wave rectified sinusoidal voltage, then the voltage at the terminal 13 would vary from a maximum or peak down to zero and then back to the peak with the same polarity. In order to prevent the voltage from going to zero (which would mean that the lamps would not be energized during the period when the input voltage is less than a minimum operating threshold value), a make-up voltage supply generally designated by reference numeral 20 stores power during peaks of the B+ voltage and couples it along a line 21 to the terminal 13 of the power transformer 15 during periods when the voltage falls below a predetermined value of the B+ source. These periods are sometimes referred to as inter-cusp periods.

Thus, the B+ voltage at terminal 13 is a full-wave rectified sinisoidal voltage which does not diminish below a predetermined, fixed minumum level. That minimum level preferably is approximately one-half the peak voltage, is seen in idealized form in FIG. 2, line L1 and generally designated by reference numeral 25.

Returning to FIG. 1, a power inverter circuit generally designated 28 includes first and second semiconductor switches 30, 31 which, as illustrated, may be N-channel, enhancement mode MOSFET's such as are commercially available under the designation IRF 730 from General Electric Co. or RCA, Inc. The power switches 30, 31 are turned "on" (i.e., switched to a conducting state) when a positive level voltage is fed to the gate input lead. When that level is removed, the associated power switch is turned "off" (i.e., non-conducting).

Power switches 30, 31 (sometimes referred to as "inverter switches") are connected in series with series-connected primary windings 16, 17. The junction between power switches 30, 31 is designated 32 and connected to ground through the current-sensing resistor 33.

The power transformer includes a secondary winding generally designated 34 which is coupled to a lamp circuit generally designated 35 and including at least one gaseous discharge lamp such as a fluorescent lamp, seen at 36. In this case, a second lamp 37 is included in the lamp circuit. Persons skilled in the art will readily appreciate that the illustrated circuit, once it is understood, may be employed to energize and operate other lamp circuit configurations or different gaseous discharge lamps, such as so-called High Intensity Discharge (HID) lamps.

Also included in the lamp circuit 35 is a passive reactance element, in this case, an inductor 38 (which may be the leakage inductance of the power transformer) is illustrated schematically as connected in series with the lamps and transformer secondary so that any current flowing in the lamps 36, 37 also flows in the inductor 38. Logic circuitry generally designated by reference numeral 40 controls the state of power switches 30, 31 in current mode control, and it also provides a suitable turn-off voltage and timing sequence for applying the control voltages for the power switches.

A first comparator circuit 41 senses the voltage at junction 32 which is a signal representative of the current flowing in whichever of the power switches 30, 31 is conducting at any given time. Comparator 42 senses the signal on its negative or inverting input lead and compares it with a fixed reference voltage $V_{ST.PT.}$ (standing for a "set point" voltage) and generates an output signal when the sensed "current" signal (actually a voltage representation of current) reaches a predetermined value determined by the set point voltage.

The logic circuit 40 includes a flip-flop circuit 43 which changes its output state each time a positive-going signal appars at its clock input, C. The output signals of the flip-flop 43 are coupled through gating circuitry to be described for turning the inverter power switches 30, 31 on and off in mutually exclusive time periods so that they operate in "push-pull" fashion with only one semiconductor switch conducting at any given time.

A brief description of the operation of the circuitry described above will now be given with the object of explaining a principal feature of the system, namely, achieving high frequency, uninterrupted excitation of the lamps using a 60 Hz. line source while regulating lamp current. If the lamp current were a pure sinusoid of constant peak amplitude, a crest factor of approximately 1.41 would be obtained.

The low frequency supply voltage is derived from the input line voltage connected to the source lines 10 and rectified by bridge circuit 12. It is fed to the input teriminal 13 of the primary winding of the power transformer 15. As mentioned, the voltage appearing at the junction 13 from output of the bridge rectifier circuit 12 would be a full-wave rectified voltage, but it is modified by power fed from the make-up power source 29 coupled from the winding 19 of the transformer 15 and storing energy in a capacitor to be described which is then coupled back to the junction 13 of the power transformer during periods when the output voltage of the bridge circuit 12 is reduced below a predetermined level. Referring to line L-1 of FIG. 2, the solid line generally designated 25 represents the B+ voltage appearing at the junction 13. Each cycle of the B+ voltage includes a portion of a sinusoidal wave form such as is designated 44a which increases to a peak and then reduces, and a fixed DC minimum level represented by the horizontal line 44b. During those inter-cusp periods when the sinusoidal voltage would ordinarily reduce to zero volts is indicated by the dashed line between the peaks (or cusps) of the sinusoidal input voltage, the make-up voltage source 20 supplies a DC level to sustain inverter operation.

Assuming operation during steady state, and, for a moment, ignoring the effect of the amplitude variation of the input voltage just discussed, it will be assumed that power switch 20 has just been turned on. A current will flow in the direction of arrow $I_1$ through the primary winding 17 of the transformer 15, the power switch 30, and the current-sensing resistor 33 to ground.

At this time, power switch 31 is non-conducting, and a voltage will appear at the secondary winding 34 of the power transformer to energize the lamp load circuit. The current $I_1$ builds up generally exponentially because of the inductive reactance in the circuit, so the voltage at the junction 32 increases in accordance with, and is representative of, the current flowing in the power switch 30. It is also representative of the current flowing in the lamp circuit, as persons skilled in the art will appreciate.

The voltage at junction 32 is coupled to the negative (or inverting) input of comparator 42. When that signal exceeds the set point voltage $V_{ST.PT.}$ which is fed to the positive (or non-inverting) input of the comparator 42, the comparator 42 will switch states. The input signal, in turn, is fed to the logic circuitry 40 and caused the flip-flop circuit 43 to change its output state, thereby turning off the power switch 30, and very shortly thereafter, turning on power switch 31, causing a similar current flow in the primary winding 16 of the power transformer as indicated by the arrow $I_2$ in FIG. 1.

In order to explain the effect of the variation in amplitude of the B+ voltage, reference is made to FIG. 3. Since the current increases in the sensing resistor 33 at the initial portion of an exponential increase, it can be considered to be substantially linear. If the voltage (or current) is rising to one level (for example, the level $V_1$ in FIG. 3), the voltage will be a line as seen at 46 in FIG. 3. If, however, the voltage is rising toward a second, higher level, such as that designated at $V_2$ in FIG. 3, then the voltage will increase as represented by the line 47. Assuming that each of the voltages 46, 47 is then terminated at a fixed level $V_0$ which is lower than the levels $V_1$ and $V_2$, voltage 46 will reach the level $V_0$ in time $t_5$, whereas voltage 47 will reach level $V_0$ at time $t_4$, which is shorter than time $t_5$. Thus, as the instantaneous voltage at input junction 13 gets greater, the resulting current slope (either $I_1$ or $I_2$) will increase, and the voltage at junction 32 will rise faster. Correspondingly, as the magnitude of the B+ voltage at junction 13 decreases, the voltage at junction 32 will have a correspondingly slower rise time, and will reach a fixed voltage in a slightly longer time. Thus, as the B+ voltage increases, the frequency of the inverter circuit will increase and as the B+ voltage decreases, the frequency of the inverter current will decrease. However, because the inverter switches are operated in current mode control, the peak value of inverter current will be constant and thus regulated, even though its frequency varies monotonically with the magnitude of the B+ voltage.

In terms of the operation of the circuitry thus far described, when the voltage at the input junction 13 is relatively high, such as at time $t_1$ in line L-1 of FIG. 2 (corresponding to a peak of the sinusoidal input voltage), the voltage at junction 32 will rise toward the level $V_{ST.PT.}$ more rapidly, and the comparator 42 will switch states more rapidly than when the input voltage is lower, such as at time $t_2$ on line L1 of FIG. 2. Similarly, the time taken for the voltage 32 to rise to the level $V_{ST.PT.}$ will be even longer when the voltage at the input junction 13 is derived solely from the make-up supply 20, such as at $t_3$ in line L-1 of FIG. 2. In all cases, however, the power switches reverse states when the current following in the switch then conducting reaches a predetermined value as represented by $V_{ST.PT.}$.

Referring now to line L-3 of FIG. 2, there are shown three sets of ramp waveforms designated respectively 48, 49 and 50 and depicting, in idealized form, the voltge at junction 32 at times $t_1$, $t_2$ and $t_3$ on line L-1 of FIG. 2. The first ramp of each of the sets of ramps 48, 49 and 50 represents the voltage at junction 32 during the time when power switch 30 is conducting, and the subsequent ramp of each set indicates the corresponding voltage at the time when power switch 31 is conducting. The resulting voltage waveform on the secondary of the power transformer is seen on line L-2 of FIG. 2. This waveform has also been drawn in idealized form to illustrate the principle involved rather than to try to depict accurately the exact frequencies or voltages, as is customary.

In summary, when the source voltage is relatively high, the frequency of the current in the primary winding (and thus the secondary winding), of the power transformer 15 is at a relatively high frequency; and when the input source voltage is relatively low, the frequency of the load current is relatively low. On the other hand, when the frequency of the load current is high, the impedance of inductor 38 is proportionately greater; and when the frequency of the lamp current is relatively low, the impedance offered by the inductor 38 is correspondingly low. Thus, the overall effect is to maintain the peak value of lamp current substantially constant.

The resulting load current, as seen in line L-4 of FIG. 2, has a peak amplitude which is substantially constant, although the frequency of the load current varies from a minimum frequency during time $t_3$, to approximately twice the minimum frequency at time $t_1$, when the B+ voltage is at a maximum. In both cases, however, the excitation frequency of the lamp is in the range of 30 KHz.–75 KHz., thereby achieving the benefits of high frequency excitation, but the crest factor of the lamp current is maintained in a desired range, as discussed more fully below. Further, current regulation and improved crest factor are achieved without sensing lamp current in the secondary of the transformer 15 (which requires inductive sensors such as current transformers) thereby minimizing bulk, cost and quality assurance restrictions. These features are achieved with an uncomplicated current mode push-pull inverter circuit with a reliable yet inexpensive circuit arrangement requiring no special magnetic circuit elements, such as might be required if the current were sensed in the secondary of the power transformer.

The circuit shown in FIG. 1 will now be described in more detail. The input section includes a fuse 52 in one of the lines 10 for system protection, a metal oxide varistor (MOV) over-voltage protection device 53 for protection against transient excursions of the input voltage, an electromagnetic interference filter circuit generally designated 54 and including series inductors L1 and L2 and shunt capacitors C1 and C2 in each input line, and the previously identified bridge rectifier circuit 12. The filter circuit not only prevents electromagnetic interference generated in the circuit from being coupled to the power lines, but it isolates the inverter switches from any high frequency transients on the input power lines. A high frequency bypass capacitor 55 is also coupled between the output of the bridge circuit 12 and ground.

Low voltage for the logic circuitry is derived from the output of the bridge circuit 12 through a resistor 56 to a zener diode 57. A filter capacitor 58 and a high frequency bypass capacitor 59 are connected across the diode 57, the low voltage source being designated $V_{cc}$. The voltage $V_{cc}$ for the logic supply is less than the output voltage of the bridge circuit 12. This voltage difference can be achieved economically by a voltage drop across a series resistor (i.e., resistor 56) in the illustrated embodiment without substantially reducing operating efficiency and without more costly components because arranging the power switches in a current mode control, push-pull configuration requires less logic circuitry and, therefore, less power than many alternative designs.

Turning now to the power inverter circuit 28, for the most part it has already been described. However, each of the power switches 30, 31 has a "snubber" circuit 60 connected across its power terminals for protecting the devices against high frequency transient signals.

Turning now to the make-up voltage source, winding 19 of transformer 15 couples power fed from the source lines 10 to a second bridge rectifier circuit 61, the output of which is connected to a storage capacitor 62. The other output terminal of the bridge circuit 61 is connected through a resistor 63 to ground; and a high frequency by-pass capacitor 64 is connected across the storage capacitor 62. A diode 65 couples the make-up voltage source to the input terminal 13 of the power transformer.

The previously described input signal to comparator 42 from the junction 32 is coupled through a resistor 67; and a capacitor 68 is connected between the negative input terminal of comparator 42 and ground and serves as a high frequency shunt. Additional signals are coupled to the negative input terminal of comparator 42 from the source voltage at junction 13 through resistor 69 and from the signal developed across resistor 63 through a resistor 70. The functions of these two signals will be described below.

Turning now to the logic circuitry 40, the flip-flop 43 is a "D" type flip-flop, having a data input designated D and a clock input designated C. The Q output of flip-flop 43 is coupled through a NAND gate 72 and an inverter 73 to the gate lead of power switch 30. The $\overline{Q}$ output of flip-flop 43 is coupled through a NAND gate 74 and an inverter 75 to the gate input of power switch 31. The $\overline{Q}$ output of flip-flop 43 is also connected to the data input D. The output of comparator 42 is connected through an inverter 76 to the clock input C of the flip-flop 43.

Turning now to the upper left-hand portion of FIG. 1, an initialization (or start-up) circuit generally designated 80 senses input voltage and inhibits operation of the logic circuit 40 until the input voltage level has reached a predetermined threshold, as during start up. The circuit includes a comparator 81 having its positive (non-inverting) input connected to a voltage divider circuit comprising resistors 82, 83 connected between the low voltage source $V_{cc}$ and ground. The output of comparator 81 is connected through a diode 84 to a junction designated 85 which is the input to the inverter 76 described above. A resistor 86 is connected between the source $V_{cc}$ and the junction 85. A resistor 87 is connected between the low voltage source and the output of comparator 81, and acts as a pull-up resistor, and a resistor 88 is connected between the positive input and the output of the comparator 81. The resistor 88 provides positive feedback to the input of comparator 81 so that once it is switched it will remain switched unless the input voltage diminishes appreciably as will be understood. This hysteresis effect of the start-up circuit prevents undesired switching of the logic enable circuit when the source voltage is passing through the threshold for operation.

A resistor 90 is connected between the low voltage source and a zener diode 91. The voltage developed across the diode 91 is coupled directly to the negative input of comparator 81.

The function of the initialization circuit 80 is to inhibit operation of the power switches until the low voltage source has stabilized when the circuit is initially energized. Resistors 82 and 83 form a voltage divider network which is designated such that the voltage fed to the non-inverting input of comparator 82 is less than the reference voltage across diode 91 until the diode conducts and clamps the voltage at the non-inverting input of comparator 82 which by design does not occur until $V_{cc}$ has nearly reached its desired value. During this initialization period, the output of the comparator 81 is clamped to ground, thereby holding the voltage at junction 85 at a low level through diode 84. The junction 85 is also connected to inputs of the NAND gates 72, 74, and serves as an "enable" signal. When the output of the comparator 82 is relatively low, the gates 72, 74 are disabled, so that the power switches cannot conduct. A positive or relatively high signal is required on the gate lead of a power switch to cause it to conduct.

A minimum frequency oscillator generally designated 95 is set at a frequency below the normal operating range and does not affect the operation of the circuit unless the operating frequency of the push-pull inverter falls below the design range or stops operating altogether. In such a case, the minimum frequency oscillator serves to operate the inverter at a minimum frequency which preferrably varies with the magnitude of the input supply voltage B+.

The minimum frequency oscillator 95 includes a capacitor 96 having one terminal grounded and the other terminal connected to the low voltage power source through a diode designated 99 of a reverse polarity, and it is also connected to the B+ voltage through a resistor 100. The positive terminal of capacitor 96 is also connected through a resistor 101 to the output of a comparator circuit 102. A comparator circuit 103 has its positive input connected to the previously described reference voltage generated across the diode 91 (as is the negative input of the comparator 102). The negative input of comparator 103 is connected to the positive terminal of the capacitor 96.

The positive input of the comparator 102 is connected through an inverter 105 to the output of the previously described inverter 76.

The set point voltage, $V_{ST.PT.}$, is generated across a capacitor 108, the positive terminal of which is connected to the movable arm of a potentiometer generally designated 109. A fixed resistor 110 is connected in series with the fixed resistor of the potentiometer 109 to the reference voltage developed across zener diode 91. As previously mentioned, the set point voltage is fed to the positive input of the comparator 42.

As mentioned, the minimum frequency oscillator 95 serves to establish a minimum switching frequency for the inverter (i.e., the power switches 30, 31) so that in the event comparator 42 does not trigger the flip-flop 43, the minimum frequency oscillator 45 will perform that function. Otherwise, it would be possible to have one of the power switches 30, 31 be left on indefinitely, thereby saturating the power transformer and preventing normal operation of the circuit.

Once the low voltage source has stabilized after the initial build-up period following turn on, so that the gates 72, 74 are enabled by the output of comparator 81, the normal operation of the circuit proceeds as follows. Assuming the power switch 30 has just been switched to a conducting state, the voltage at the junction 32 increases as current flows through resistor 33. That voltage signal is fed through resistor 67 to the negative input of comparator 42, the positive input of which is at the fixed set point voltage. When the increasing voltage appearing on the negative input of comparator 42 exceeds the set point voltage, the output of comparator 42 switches to a relatively low voltage which is fed directly to the gates 72, 74 to disable them for a short period of time to permit the flip-flop 43 to switch its state and to permit current flowing through power switch 30 to return to zero (which does not happen instantaneously).

When the current flowing through the power switch 30 (which had just been turned off) returns to a zero level, and after the output stage of flip-flop 43 has changed, the output of comparator 42 again goes positive because current stops flowing through switch 30 so the voltage at terminal 32 diminishes beneath the set point voltage. This causes gates 72, 74 once more to be enabled, but the signal inputs from the flip-flop 43 have now assumed their complementary states so that whereas in the previous half cycle, power switch 30 had been conducting, when the gates 72, 74 are once more enabled, power switch 31 is turned on.

As illustrated in idealized form in FIG. 4, the voltage on the negative (inverting) input of comparator 42 is represented by the ramp voltage 107. When that voltage exceeds the set point voltage, the output of comparator 42 goes relatively low, thereby disabling the switches 72, 74 and turning off the power switch 30 at time $t_6$ in FIG. 4. The current flowing through the switch takes some finite time to reduce to zero as indicated by the portion 108, although the lines 107 and 108 are not necessarily drawn to the same time scale. The same output signal of comparator 42 which disables the gates 72, 74 is inverted by inverter 76 and fed to the clock input C of the flip-flop 43 to cause its outputs to change state because of Q output is connected to the data input D of the flip-flop. The gates 72, 74 are disabled before flip-flop 43 changes its state so that the switching signals on the output leads of the flip-flop are not fed directly to the power switches.

At the same time, the output signal of the inverter 76 is coupled through inverter 105, the output signal of which is a negative pulse which causes comparator 102 to switch to a low output level and thereby create a low impedance path for quickly discharging capacitor 96. This resets the timing of the minimum frequency oscillator and synchronizes it with the switching of the inverter switches under normal operating conditions.

If the voltage at junction 32 does not rise to the set point voltage within the design period of the minimum frequency oscillator 95, the minimum frequency oscillator will nevertheless sustain operating at a minimum frequency as follows. When comparator 102 changes state from a relatively low voltage output to a relatively high voltage output, the output of the comparator is floating so that it becomes a comparatively high impedance and is not a substantial factor in charging capacitor 96. Rather, capacitor 96 is charged as a function of the magnitude of voltage of the B+ supply (through resistor 100). Thus, when the voltage on capacitor 96 exceeds the reference voltage across zener diode 91, comparator 103 will switch its output from a relatively high voltage level to a low voltage level, thereby disabling gates 72, 74, triggering the clock input of the flip-flop 43 via inverter 76, and causing the output of comparator 102 to go low. This discharges capacitor 96 which, in turn, causes comparator 103 to change states once more so that its output goes to a relatively high voltage level. As described above, when the signal at junction 85 goes positive, gates 72, 74 are enabled once more, but since the state of flip-flop 43 has changed, the complementary power switch (30, 31) will conduct this half cycle.

The timing of the charging of capacitor 96 depends primarily on the value of the capacitor and the value of resistor 100, and the magnitude of the B+ voltage. The minimum operating frequency of the minimum frequency oscillator (which is not a fixed frequency oscillator, it will be observed, because of the influence on the charging timer capacitor 96 caused by the value of the B+ voltage), is designed to be lower than the minimum operating frequency of the inverter during normal operation. This insures that the inverter will be operating as designed for normal operation and not under the minimum frequency oscillator. When, during normal operation, the output of the comparator 42 goes low (representative of the current in the then-conducting switch reaching a predetermined peak value), the gates 72, 74 are disabled, as described, and the flip-flop 43 is clocked, but also, the same signal is fed through inverter 105 to cause the comparator 102 to change states and have its output grounded, thereby discharging capacitor 96 and resetting the time base for the minimum frequency oscillator. Thus, the minimum frequency oscillator is synchronized automatically each half cycle, with the switching on of the power switches. The minimum frequency oscillator comes into play only after the current in current sensing resistor 33 and the voltage at junction 32 do not exceed the set point voltage during a period of time longer than the time it takes capacitor 96 to charge to the reference voltage of the positive input of comparator 103.

If the B+ voltage is relatively high, then the time for the voltage at junction 32 to reach the set point voltage will be correspondingly less. Similarly, the period of the minimum frequency oscillator 95 will be correspondingly less and the operating frequency will be higher because, with the B+ voltage comparatively high, charging current through resistor 100 to charge the timing capacitor 96 will be correspondingly greater, thereby reducing the time for the capacitor to charge to the reference voltage on the positive input of comparator 103.

Thus, the base or set frequency of the minimum frequency oscillator increases and decreases as the B+ voltage increases and decreases. Persons skilled in the art will appreciate that having the base frequency of the minimum frequency oscillator 95 vary with the value of B+ voltage reduces the requirements and thus the size of the power transformer. Reduced size, in turn, reduces its cost.

There is a short delay time in turning the power switches off—that is, between the time the voltage input to the switching level and the time the signal is propagated through the comparator and goes to cause the current through the switch to stop flowing. This causes a slight overshoot in the current flowing through the switches after the switching level at 32 is reached so that the current flowing at the time of shut-off may be above the desired current level. Since the rate of rise of current flowing in the switches is a function of the applied voltage (that is, the B+ voltage), this overshoot will also be a function of applied voltage. In other words, the overshoot will be greater twhen the B+ voltage is at its peak than when it is at the make-up voltage level. In order at least partially to compensate this effect, resistor 69 is connected between the B+ voltage terminal 13 and the inverting input of comparator 42. As the B+ voltage becomes greater, more current is fed through resistor 69, causing comparator 42 to change states earlier than otherwise would occur, and thereby compensating for the overshooting current mentioned above.

Resistor 70 and its associated circuitry compensates for yet another effect. The storage capacitor 62 which stores power for the make-up voltage during the inter-cusp period is charged by the bridge circuit 61 only when the B+ voltage is near a peak, and during that time, energy drawn from the source reduces the energy available to the lamp circuit. Since a constant load current is desired, and some input power is diverted to the makeup power source as just indicated, a signal is generated across resistor 63 during the time when capacitor 62 is being charged. This signal is a negative signal which draws a slight current through resistor 70 and causes the current through resistor 33 to rise to a slightly higher value before the input signal to the inverting input of comparator 42 will switch. The additional power is coupled to store energy in storage capacitor 62 for use during the inter-cusp period of source voltage and thereby partly compensate for the effect of draining power during voltage peaks of the primary source voltage to charge the make-up capacitor 62 by extending the "on" time of the power switches as a function of the magnitude of the B+ voltage.

Inductor 38 is illustrated in FIG. 1 as a separate component. Preferably, however, it is incorporated into the magnetic design of the power transformer 15. In either case, whether a separate component is included or the transformer 15 is designed to have the desired higher impedance at higher frequency, the overall effect is that as the inverter operating frequency increases, the impedance seen by the power switches also increases and the lamp load current remains substantially constant. By way of example, for the range of operating frequency indicated below, if the inductor 38 is designed as the leakage inductance of the power transformer 15, it may be approximately 4 mhy.

By way of further illustration, with the components indicated in Table A below, and with two 34-watt lamps in the lamp circuit, the operating frequency of the power inverter under normal conditions (i.e., without the minimum frequency oscillator being actuated) varies from 30 KHz to 75 KHz; and a crest factor of approximately 1.6 has been obtained. With the components indicated in Table B below, the minimum frequency oscillator operates in a frequency range from approximately 23 KHz to 40 KHz.

TABLE A

| Component | Value |
| --- | --- |
| resistor 33 | 0.5 ohm |
| diode 91 | 4.7 volts (break-down) |
| resistor 63 | 1.0 ohm |
| resistor 70 | 3.3K ohm |
| resistor 32 | 1.0K ohm |
| resistor 69 | 330K ohm |
| resistor 67 | 1.0K ohm |

TABLE B

| Component | Value |
| --- | --- |
| diode 91 | 4.7 volts (break-down) |
| diode 57 | 12 volts ($V_{cc}$) |
| resistor 100 | 330K ohm |
| capacitor 96 | .001 ufd. |

In addition to the features and advantages mentioned above in connection with particular aspects of the embodiment illustrated in FIG. 1, persons skilled in the art will appreciate that measuring inverter current in the circuit connected to the primary winding of the power transformer, as distinguished from the load circuit in the secondary of the transformer further reduces cost because it eliminates any need for a current transformer in the secondary or load circuit.

Referring now to FIG. 5, there is shown an alternative embodiment of the invention which uses current mode regulation as described above, but which includes the switches and power transformer in a half-bridge circuit configuration, as distinguished from the push-pull arrangement shown in FIG. 1 and described above. The half-bridge circuit has isolating transformers for sensing current in, and for driving the power switches and these components will increase cost. The half-bridge configuration also requires increased capacity in the low voltage (i.e., logic) power supply. On the other hand, the half-bridge circuit arrangement permits the use of power MOSFET switches with lower voltage and higher current ratings which currently are less expensive. Thus, the half-bridge circuit may be used, for example, with a 277 V line voltage.

In the half-bridge circuit of FIG. 5, the B+ voltage is derived with a full-wave rectifier and a make-up source as described in connection with the embodiment of FIG. 1. Corresponding elements in FIG. 5 are given the same reference numeral as in FIG. 1 followed by an "A". Thus, the MOSFET power switches are designated 30A and 31A and are connected in series across the B+ supply. Capacitors 220 and 221 are also connected in series across the B+ supply voltage in lieu of capacitor 55; and the primary winding 222 of power transformer 223 forms the diagonal branch of the bridge circuit. The lamp load circuit 35A is connected to the secondary winding 224 of the power transformer. Although not illustrated in the drawing of FIG. 5, power transformer 223 has a leakage inductance similar to that designated 38 in FIG. 1 and performs a similar function.

In the embodiment of FIG. 5, current flowing in the conducting power switch is sensed by a current transformer 226 having its primary coil connected in series with primary winding 222. Alternatively, the current transformer could be in the secondary of the power transformer. The output signal of current transformer 226 is coupled to the input of logic circuit 40A which may be substantially the same as the previously described logic circuit 40, since it is responsive to the absolute value of the output of current transformer 226 (i.e., not polarity sensitive). In particular, the output of the current transformer 226 may be coupled through a diode bridge (which gives a signal representative of the absolute value of the input signal and is not sensitive to the polarity of the input signal) to the junction of resistor 70 and capacitor 68 of FIG. 1 (which is the same as the non-inverting input of comparator 42). The inverter drive signals of inverter circuits 73, 75 are, in this case, coupled to the primary winding 228 of a drive transformer 229 having two secondary windings 230 and 231 which are connected in the gate circuits respectively of the power switches 30A, 31A. Resistor 67 of the FIG. 1 embodiment is not eliminated. The drive transformer 229 has its secondary windings arranged in a polarity to cause only one of the switches to conduct at any given time. When switch 30A conducts, for example, current flows from the positive terminal of the B+ voltage through MOSFET 30A, the primary of current transformer, the primary winding 222 of the power transformer (from the plus to the minus terminal) and capacitor 221 to the negative terminal of the B+ supply. When the value of the current sensed by the current transformer reaches the preset value, the bistable circuit of the logic circuit switches states; and after switch 30A becomes non-conducting switch 31A is turned on and current flows through capacitor 220, primary winding 222 (this time in the opposite direction), the current transformer and switch 31A. Thus, an alternating current is generated in the power transformer to energize the lamp load circuit 35A.

As in the first embodiment, the frequency of operation of the inverter increases and decreases, but the peak value of current flowing in the primary (and secondary) of the power transformer 223 is substantially constant. As the inverter frequency increases, the leakage reactance of the power transformer is such as to present an increased impedance so that the peak value of load current also remains substantially constant and the crest factor of load current remains below desired value.

Figure 6:
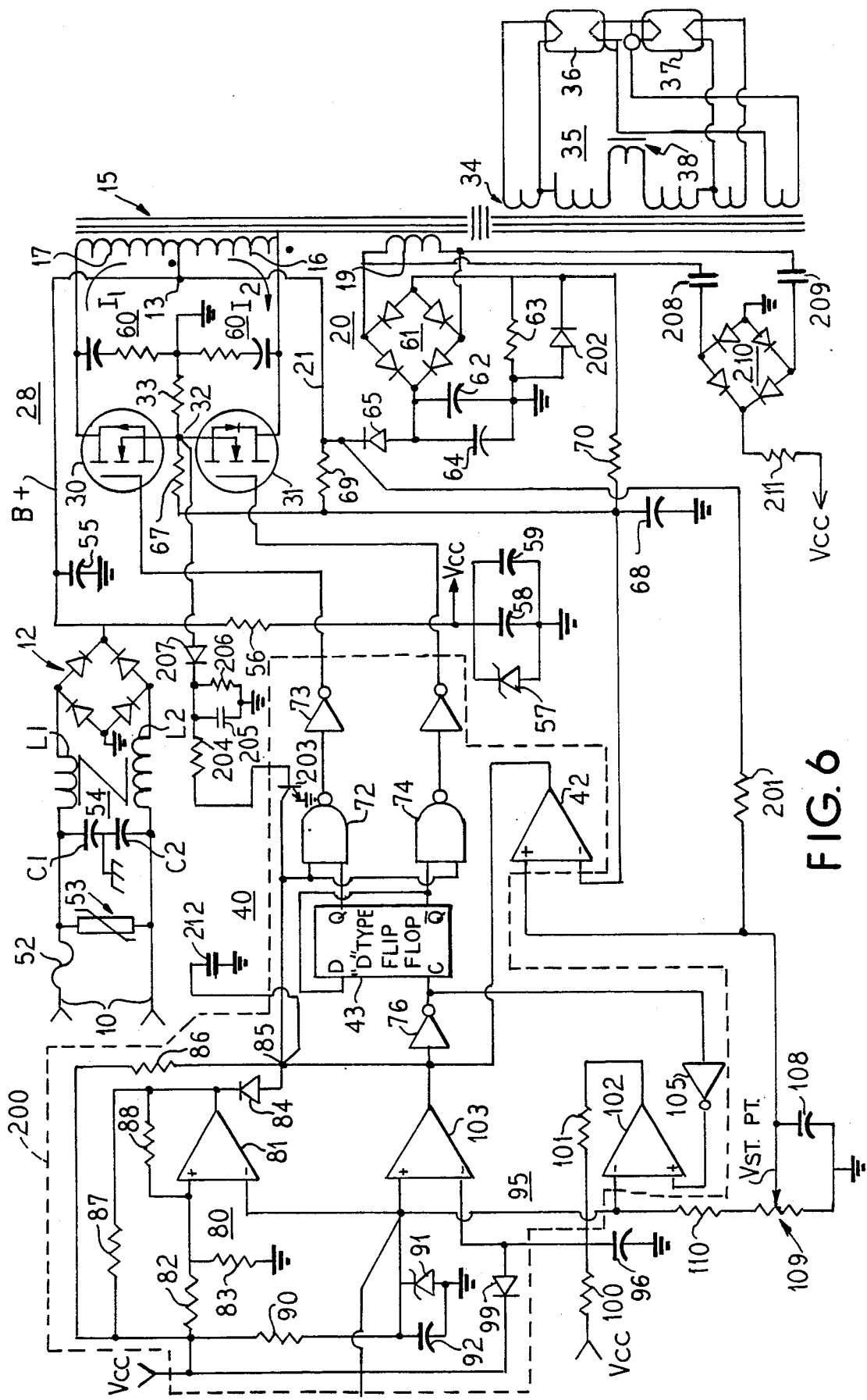
FIG. 6 is a circuit schematic diagram of the FIG. 1 circuit having additional circuit features.
Figure 7:
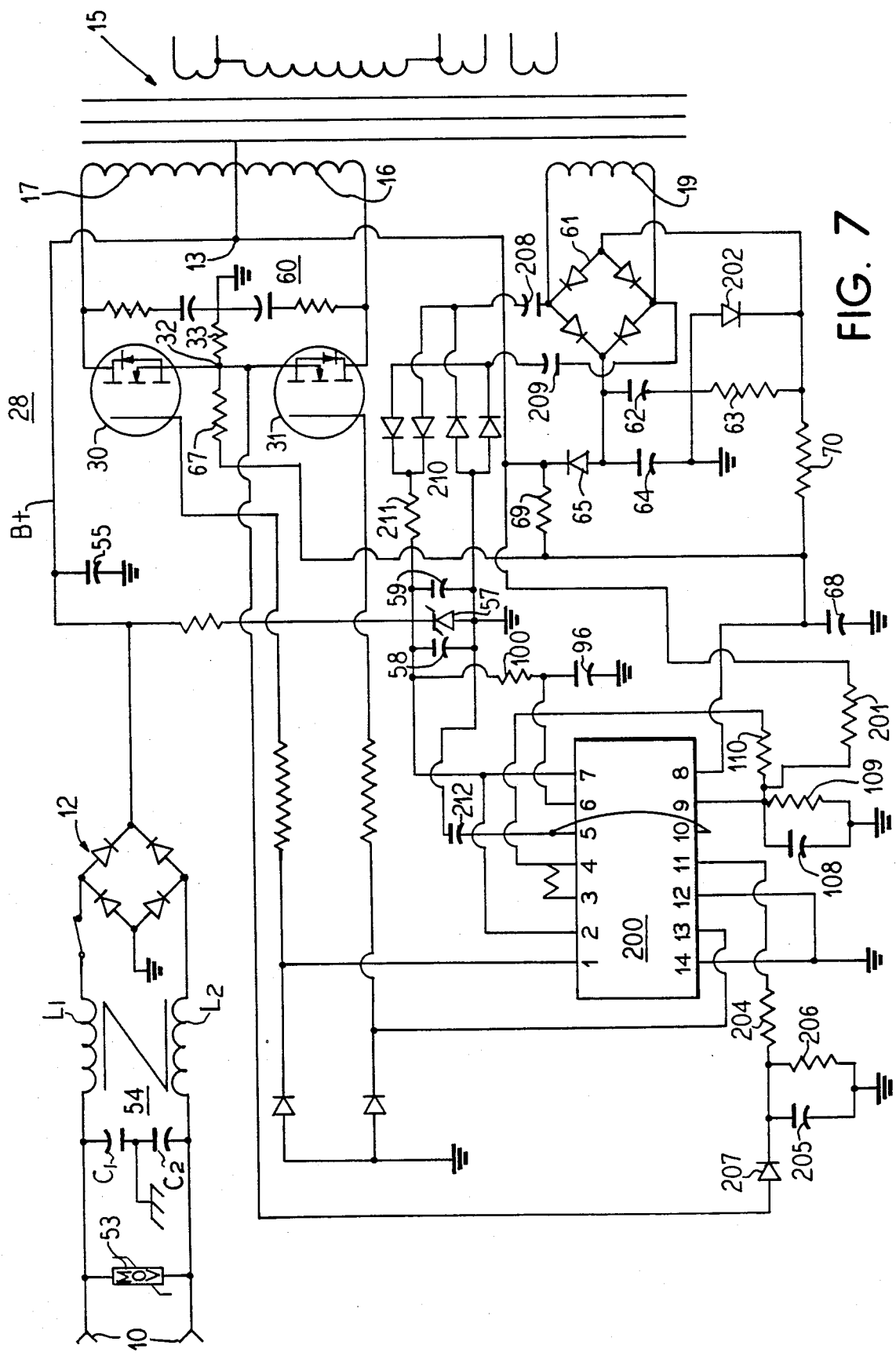
FIG. 7 is a circuit schematic diagram of the FIG. 6 circuit with a portion thereof integrated into a semiconductor chip.

A number of additional circuit features can be utilized to enhance the FIG. 1 high frequency inverter ballast circuit. These circuit features are shown in FIG. 6. The portion 200 identified in FIG. 6 can be integrated into a semiconductor chip using standard techniques. The resulting "chip" circuit is shown in FIG. 7 and operates in substantially the same manner as the FIG. 6 circuit. The circled numbers 1 through 14 in FIG. 6 denote the pin connections 1 through 14 of the semiconductor chip 200 in FIG. 7. The additional circuit features will now be described in reference to both FIGS. 6 and 7.

A resistor 201 is connected between terminal 13, the B+ voltage, and the positive input of comparator 42, the set point voltage, $V_{ST.PT.}$. This resistor produces a slight variation in the set point voltage with changes in input line voltage.

Under normal operating conditions compensating resistor 69, connected between the negative input of comparator 42 and terminal 13, changes the current sense level with input line voltage. The reason for the compensation is because of the small amount of delay in the control loop that allows a small current overshoot. This refers to the short delay in turning the power switches off, that is, between the time the voltage on the negative terminal of the comparator 42 exceeds the set point voltage on the postive terminal and the time the switch is turned off and current ceases to flow in the inverter. Thus, resistor 69 modifies the signal on the negative input of the comparator 42 to offset the overshoot in the inverter current through resistor 33.

However, this compensation also means that when the local power utility company tries to reduce the line voltage, for example, during a brown out, the power drawn by the circuit shown in FIG. 1 will increase. This situation may be substantially avoided by inclusion of compensating resistor 201. This resistor 201 will change the value of the set point voltage such that the time the current through resistor 33 takes to reach the modified set point voltage can be adjusted to avoid increased power consumption for a reduced line voltage. Resistor 201 has a value sufficient with capacitor 108 to provide a long time constant compared to the 120 Hz of the B+, thus modifying the set point voltage for a general increase or decrease in the input line voltage.

Another circuit feature is the addition of diode 202 having its anode connected to ground and its cathode connected to the junction of resistors 63 and 70. High peak currents may flow through the power switch devices and also at the input of the ballast during start-up due to the charging of the storage capacitor 62 in the make-up voltage source 20. This charging current flows through resistor 63 producing positive feedback in the control circuitry.

Placing the diode 202 in parallel with the sensing resistor 63 of the make-up power supply 20 limits the voltage which can occur across resistor 63 thereby limiting its effect on the signal supplied to the positive input of comparator 42 through resistor 70. Positive feedback in the circuit is thereby limited.

Under normal operation of the circuit the current sensing signal is supplied to the negative input of comparator 42 to control the commutating of switches 30 and 31 and thereby regulate the current flowing therethrough. However, it is possible that when a fixture has no lamps inserted into it, the output inductance may resonant with the capacitance of the unlamped fixture to produce fast rising current spikes to which comparator 42 cannot respond. Since it is common to change fluorescent lamps without turning off the ballast circuit, the circuit must be protected against this situation. Thus, another additional circuit feature is a high current limit circuit which supplements the existing current sensing. The high current limit circuit reacts to abnormal high currents through the switches with a much faster response time than the current sensing loop through comparator 42. It is necessary to maintain both circuits because the high current limit circuit is not accurate enough for controlling the inverter under normal operating conditions.

The high current limit circuit has a diode 207 with its anode connected to node 32 in the inverter 60. Resistor 206 and capacitor 205 are connected in parallel between the cathode of diode 207 and ground. A resistor 204 connects the cathode of diode 207 to the base of transistor 203. The emitter of transistor 203 is connected to ground and the collector is connected to node 85, that is, one of the inputs of each of the NAND gates 72 and 74. The high current limit circuit provides that when a higher than normal current flows through resistor 33 in the inverter 60, the voltage of the base of transistor 203 is sufficient to cause transistor 203 to turn on thereby grounding node 85 and disabling gates 72 and 74. The inverter 60 is thus turned off. Before transistor 203 turns on, capacitor 205 has been charged and the transistor 203 is held in a state of conduction an amount of time until capacitor 205 discharges through resistor 206 and through resistor 204 and transistor 203. Thus, the inverter 60 is turned off for an amount of time after the high current level is sensed determined by the level of the high current. Transistor 203 causes the gates 72 and 74 to be disabled much faster than it is possible for the signal through comparator 42 to disable gates 72 and 74. Additionally, a diode 213 may be inserted between resistor 204 and the base of transistor 203 to increase the current level necessary to activate the high current limit circuit.

In the FIG. 1 circuit, low voltage for the logic circuitry is derived from the output of the bridge circuit 12 through resistor 56 to a zener diode 57. The filter capacitor 58 and the high frequency bypass capacitor 59 are connected across the diode 57. It is desirable, however, to reduce the magnitude of resistor 56 such that it only provides enough current to start the semiconductor chip 200 and the inverter 60, thereby reducing the amount of heating that can occur in resistor 56. This result may be achieved with the low voltage supply designed to use high frequency feedback as shown in FIGS. 6 and 7.

A pair of high frequency coupling capacitors 208 and 209 connect winding 19 of transformer 15 to a third bridge rectifier circuit 210. One output of bridge rectifier circuit 210 is connected to ground and the other output is connected through resistor 211 to the junction of resistor 56 and zener diode 57, that is, the low voltage supply, $V_{cc}$. After the semiconductor chip 200 starts driving the inverter 60, the high frequency voltage is derived from winding 19 in the make-up voltage supply 61 and fed via capacitors 208 and 209 to the full-wave bridge rectifier circuit 210. The high frequency AC is rectified and provides supplemental current to the low voltage supply, $V_{cc}$. The sum of the currents through resistors 56 and 211 is sufficient to maintain semiconductor chip and drive currents.

During normal operation of the inverter 60, when one of the switches is turned off, for example 30, the current $I_1$ flowing through inductor 17 flows through the snubber circuit associated with switch 30 and voltage starts to build up across switch 30. Simultaneously, the charged voltage in the snubber circuit associated with switch 31 starts to decrease. It is desireable to turn on switch 31 when the voltage across it is approximately zero. Thus, both switches 30 and 31 must be in a momentary off state. This means that gates 72 and 74 must be disabled during this time period.

The discrete component circuit shown in FIG. 1 typically has enough natural capacitance associated with node 85, which controls gates 72 and 74, that switch 30 cannot turn on too soon. However, in the "chip" circuit shown in FIG. 7, the response time may be much faster and it is possible for switch 30 to turn on while there is still significant voltage across it.

To avoid this situation and to provide a time delay before the gates 72 and 74 are enabled, a capacitor 212 is connected between node 85 and ground. If needed, the capacitor 212 is connected between node 85 and ground. If needed, the capacitor 212 may also be used with the discrete component circuit as shown in FIG. 6.

In the FIG. 1 circuit, the minimum frequency oscillator is connected to the B+ voltage through a resistor 100. During starting or lamp out conditions, the oscillator controls the frequency of operation. Actually a range of operating frequencies results, one of which might excite parasitic resonances in the unlocked output transformer circuit. To avoid this occurance, the minimum frequency oscillator may be connected to the low voltage, $V_{cc}$, instead of to the B+ voltage. It is to be understood that in this embodiment the minimum frequency oscillator cannot change frequency with changes in the magnitude of the B+ voltage, but can be set at a frequency well away from the parasitic resonance.

It is to be understood that the additional circuit features shown in FIGS. 6 and 7 and described in reference to the FIG. 1 circuit, can be also utilized with the alternative embodiment shown in FIG. 5.

Persons skilled in the art will appreciate that certain of the above elements may be changed, or equivalents may be substituted for those circuits or components disclosed, while continuing to practice the principle of the invention; and it is, therefore, intended that all such modifications and substitutions be covered as they are embraced within the spirit and scope of appended claims.

What is claimed is:

1. The electronic circuit for receiving input electrical power at a lower frequency for energizing a load circuit at higher frequency comprising:

voltage source means receiving said input electrical power for generating a source voltage having a varying magnitude and a predetermined minimum voltage;

non-resonant inverter circuit means including first and second switching means connected in circuit with said voltage source means and said load circuit;

logic circuit means responsive to a sensed signal representing only current flowing in said first and second switching means for operating said first and second switching means to conduct alternately by switching a conducting one of said switching means to a non-conducting state when the current flowing therein reaches a predetermined value and thereafter switching the other of said switching means to conduct until the current flowing therein reaches a predetermined value, whereby the frequency of current in said load circuit varies as the magnitude of said source voltage varies; and reactance circuit means connected in circuit with said load circuit, the operating frequency range of said inverter circuit means and the impedance of said reactance circuit means being such that as the magnitude of said source voltage changes the operating frequency of said inverter circuit means changes and the resulting impedance of said reactance circuit means is such that the peak amplitude of current in said load circuit remains substantially constant.

2. The apparatus of claim 1, wherein said voltage source means comprises rectifier circuit means for generating a full-wave rectified voltage; and make-up power means receiving power from said full-wave rectified voltage for storing energy for use during periods when the output voltage of said rectifier circuit means falls below said predetermined minimum voltage.

3. The apparatus of claim 2, wherein said logic circuit means having a bistable circuit means having complementary outputs for determining the states of said first and second switching means respectively; sensing circuit means for generating said sensed current signal representative of the instantaneous currrent flowing through said switching means; and first comparator circuit means receiving said sensed signal for changing the state of said bistable circuit means when said sensed current reaches a predetermined set point signal representative of a desired current level flowing in said switching means.

4. The apparatus of claim 3, wherein said load circuit having a power transformer coupled in circuit with said voltage source means and said first and second switching means, whereby said sensed current signal is a ramp signal having a rise time slope which increases when the magnitude of said source voltage increases and which decreases when the magnitude of said source voltage decreases, thereby to change the operating frequency of said inverter circuit means.

5. The apparatus of claim 4, wherein said sensing circuit means comprises resistive means connected in circuit with said first and second switching means and in the primary circuit of said power transformer.

6. The apparatus of claim 4, further comprising first compensating circuit means for adding a first compensating signal to said sensed signal when the amplitude of the voltage of said voltage source means is relatively high, thereby at least partially to compensate for current overshoot in the shutting off of said first and second switching means.

7. The apparatus of claim 6, further comprising second compensating circuit means responsive to the charging of said make-up voltage source means for adding a second compensating signal to said sensed signal to increase the conduction time of said switching means when input power is being tapped to charge said make-up voltage source means.

8. The apparatus of claim 1, further comprising minimum frequency oscillator circuit means connected in circuit with said inverter circuit means and responsive to the operation thereof for operating said inverter circuit means if said inverter circuit means does not switch within a predetermined maximum time period, whereby said minimum frequency oscillator circuit means will continue to operate said inverter circuit means at a minimum frequency in the absence of said sensed current signal.

9. The apparatus of claim 8, further comprising timing circuit means for determining the operating frequency of said minimum frequency oscillator circuit means; and third compensating circuit means for modifying said timing circuit means to increase the frequency of said minimum frequency oscillator circuit means when the magnitude of said source voltage increases.

10. The apparatus of claim 1, further comprising initialization circuit means for disabling said logic circuit means for a period of time after input power is applied thereto and until said source voltage has reached a predetermined threshold.

11. The apparatus of claim 10, wherein said initialization circuit includes a comparator circuit for comparing a signal representative of logic source voltage and a reference voltage for generating an enable signal when said logic source voltage is greater than said reference voltage and for coupling said enable signal signal to said logic circuit means.

12. The apparatus of claim 11, further comprising circuit means for generating a positive feedback on said comparator circuit whereby said initialization circuit has a hysteresis effect in its operating characteristic.

13. The apparatus of claim 1, further comprising a power transformer coupled in circuit with said inverter circuit means and said load circuit for delivering power at said higher frequency to said load circuit and wherein said reactance circuit means is leakage inductance of said power transformer.

14. The apparatus of claim 1, further comprising an electromagnetic interference filter circuit between said input power and said voltage source means for providing high frequency isolation between said circuit and input power lines.

15. The apparatus of claim 7, further including a low voltage supply circuit for said logic circuit means receiving power from said voltage source and characterized in having a series resistance for effecting a drop in voltage between said voltage source and the output of said low voltage supply circuit.

16. The apparatus of claim 1, wherein said first and second switching means are connected in series having a first junction between them and said load circuit includes a transformer having first and second primary windings having a second junction between them and wherein said voltage source means is connected between said first and second junctions and said first and second primary windings are in series with each other and in parallel with said series-connected first and second switching means; said switching means being operated in push-pull relation.

17. The apparatus of claim 1, wherein said first and second switching means are connected in series having a first junction between then and said voltage source connected across said series-connected first and second switching means; and further comprising first and second capacitors connected in series with each other and to provide a second junction between them and connected in parallel with said series-connected first and second switching means; and wherein said load circuit is connected between said first and second junctions.

18. An electronic ballast circuit receiving electrical power from a source at one frequency and providing power at higher frequency comprising:
load circuit means including at least one gaseous discharge lamp:
a power transformer having at least first and second primary windings and an output coupled to said load circuit for energizing the load circuit;
first bridge circuit means coupled to said source for generating a full-wave rectified source voltage;
make-up voltage means for supplying a generally constant voltage to the output of said bridge circuit means during periods when said full-wave rectified source voltage falls below a predetermined value, said make-up voltage means receiving power at said higher frequency;
first and second power switching means connected in nonresonant circuit respectively with said first and second portions to primary windings of said power transformer to provide power at said higher frequency;
logic circuit means for operating said first and second power switching means in current mode control, responsive only to the instantaneous current flowing in said first and second power switching means, by turning off a conducting one of said switching means when the current flowing therein reaches a predetermined value, and for immediately thereafter causing the other power switching means to conduct, said logic circuit means under normal operation repetitively and continuously causing said switching means to conduct and to turn off in mutually exclusive and successive time relationship, such that the frequency of switching of said power switching means is increased as the instantaneous value of the source voltage increases, thereby to regulate the peak current in said power switching means to a substantially constant value; and
reactance circuit means associated with said load circuit such that as the source voltage increases and the frequency of operation of said power switching means increases, the impedance of said load circuit increases, whereby the peak current flowing in said gaseous discharge lamp is rendered substantially constant irrespective of variations in the amplitude of said source voltage.

19. A nonresonant electronic frequency inverter circuit receiving input electrical power at a lower frequency and energizing a load circuit in a range of higher frequencies, comprising:
first and second switching means receiving said input power and energizing said load circuit;
logic circuit means for operating said first and second switching means in current mode control, responsive only to the instantaneous current flowing in said first and second power switching means such that said first and second switching means operate at said load circuit varies as the magnitude of said source voltage varies; and
reactance circuit means associated with said load circuit such that as the source voltage increases and the frequency of operation of said power switching means increases, the impedance of said load circuit increases, whereby the peak current flowing in said gaseous discharge lamp is rendered substantially constant irrespective of variations in the amplitude of said source voltage.

20. The electronic circuit for receiving input electrical power at a lower frequency and for energizing a load circuit at a higher frequency:
means for generating a source voltage receiving said input electrical power and having a varying magnitude;
means for inverting said lower frequency to said higher frequency having first and second means for switching and connected in circuit with said means for generating a source voltage and said load circuit, said means for inverting being nonresonant;
means for controlling said first and second means for switching responsive to a sensed signal representing only current flowing in said first and second means for switching, said means for controlling operating said first and second means for switching to conduct alternatively by switching a conducting one of said means for switching to a non-conducting state when the current flowing therein reaches a predetermined value and thereafter switching the other of said means for switching to conduct until the current flowing therein reaches a predetermined value;
means for providing a reactance circuit connected in circuit with said load circuit, an operating frequency range of said means for inverting and the impedance of said reactance circuit being such that as the magnitude of said source voltage changes, said high frequency of said means for inverting changes and the resulting impedance of said reactance circuit is such that the peak amplitude of current in said load circuit remains substantially constant.

21. The electonic circuit according to claim 20, wherein said sensed signal is representative of the magnitude of current flowing in said first and second means for switching and wherein said means for controlling commutates said means for switching every time said magnitude of current reaches said predetermined value.

22. The electronic circuit according to claim 20, wherein said source voltage has a predetermined minimum voltage.

23. The electronic circuit according to claim 20, wherein frequency of current in said load circuit varies as the magnitude of said source voltage varies.

24. The electronic circuit according to claim 20, wherein said means for controlling causes switching on said first and second means for switching to occur at a time relative to a substantially zero magnitude of the voltage across said means for switching.

25. The electronic circuit according to claim 20, wherein said means for generating a source voltage comprises means for generating a full-wave rectified voltage, and means for receiving power from said full-wave rectified voltage for storing energy for use during periods when an output voltage of said means for generating a source voltage falls below a predetermined minimum voltage.

26. The electronic circuit according to claim 20, wherein said electronic circuit further comprises first means for protecting said first and second means for switching from excessively high currents flowing therethrough, and second means for protecting said first and second means for switching from parasitics resonances which may occur in said means for providing a reactance circuit.

27. The electronic ciruit according to claim 20, wherein said circuit comprises a plurality of means for adding compensating signals to said sensed signal.

28. The electronic circuit according to claim 20, wherein said circuit comprises at least one means for adding a compensating signal to said sensed signal.

29. The electronic circuit according to claim 20, wherein said electronic circuit further comprises low voltage supply circuit for at least said means for controlling, said low voltage supply circuit receiving power from said means for generating a source voltage, and means for providing supplemental low voltage power in addition to said low voltage supply, said means for providing supplemental low voltage power receiving high frequency power from said means for inverting.

30. The electronic circuit according to claim 29, wherein said means for providing supplemental low voltage power is transformer coupled to said means for inverting.

31. The electronic circuit according to claim 29, wherein said means for providing supplemental low voltage power comprises means for generating a full-wave rectified low voltage.

32. The electronic circuit according to claim 20, wherein said electronic circuit further comprises means for rapidly commutating both said first and second means for switching to an off state in response to current flowing only in said first and second means for switching exceeding a predetermined high magnitued.

33. The electronic circuit according to claim 32, wherein said means for rapidly commutating comprises first means for receiving a first signal representative of current flowing only in said first and second means for switching, said first means connected to second means for causing said means for controlling to switch both said first and second means for switching to a non-conducting state and third means for timing connected to said second means, said second means being operational when said first signal exceeds said predetermined high magnitude and said means for timing keeping said second means operational for a predetermined time period after said first signal does not exceed said high magnitude.

34. The electronic circuit according to claim 20, wherein said means for controlling, after switching a conducting one of said means for switching to a non-conducting state, delays for a predetermined time before switching the other of said means for switching to a conducting state, said means for controlling comprising means for delaying to provide said predetermined time.

35. The electronic circuit according to claim 20, wherein said means for controlling includes a bistable circuit having complementary outputs for determining the states of said first and second means for switching respectively; means for sensing generating said sensed current signal representative of the instantaneous current flowing through said first and second means for switching; and first means for comparing receiving said sensed signal for changing the state of said bistable circuit when said sensed current reaches a predetermined set point signal representative of a desired current level flowing in said first and second means for switching.

36. The electronic circuit according to claim 35, wherein said electronic circuit further comprises means for changing said predetermined set point signal in response to changes in a voltage level of said input electrical power.

37. The electronic circuit according to claim 36, wherein said means for changing said predetermined set point signal comprising a series resistance connected between said means for generating a source voltage and said means for comparing.

38. The electronic circuit according to claim 20, wherein said load circuit includes a power transformer coupled in circuit with said means for generating a source voltage and said first and second means for switching, whereby said sensed current signal is a substantially ramp signal having a rise time slope which increases when the magnitude of said source voltage increases and which decreases when the magnitude of said source voltage decreases, thereby to change the operating frequency of said means for inverting.

39. The electronic circuit according to claim 38, wherein said means for sensing comprises means for providing resistance connected in circuit with said first and second means for switching and in a primary circuit of said power transformer.

40. The electronic circuit according to claim 20, further comprising first means for compensating adding a first compensating signal to said sensed signal when the amplitude of said source voltage is relatively high, thereby shutting off said first and second means for switching to at least partially compensate for current overshoot.

41. The electronic circuit according to claim 40, further comprising second means for compensating responsive to the charging of said means for storing energy for adding a second compensating signal to said sensed signal to increase the conduction time of said means for switching when input power is being tapped to charge said means for storing energy.

42. The electronic circuit according to claim 41, wherein said electronic circuit further comprises means for limiting said second means for compensating such that said second compensating signal is limited to a predetermined maximum value thereby establishing an upper limit in conduction time of said first and second means for switching in response to said second compensating signal.

43. The electronic circuit according to claim 20, further comprising means for providing a minimum frequency connected in circuit with said means for inverting and responsive to the operation thereof for operating said means for inverting if said means for inverting does not switch within a predetermined maximum time period, whereby said means for providing a minimum frequency will continue to operate said means for inverting at a minimum frequency in the absence of said sensed current signal.

44. The electronic circuit according to claim 43, wherein said electronic circuit further comprising a low voltage supply circuit to provide a low voltage for said means for controlling, said low voltage supply circuit receiving power from said means for generating a source voltage;
means for timing which determines the operating frequency of said means for providing a minimum frequency; and
third means for compensating connected to said means for timing to control the frequency of said means for providing a minimum frequency relative to said low voltage.

45. The electronic circuit according to claim 43, further comprising means for timing for determining the operating frequency of said means for providing a minimum frequency; and third means for compensating modifying said means for timing to increase the frequency of said means for providing a minimum frequency when the magnitude of said source voltage increases.

46. The electronic circuit according to claim 20, further comprising means for initialization for disabling said means for controlling for a period of time after input power is applied thereto and until said source voltage has reached a predetermined threshold.

47. The electronic circuit according to claim 46, wherein said means for initialization includes a comparator circuit for comparing a signal representative of a logic source voltage and a reference voltage for generating an enable signal when said logic source voltage is greater than said reference voltage and for coupling said enable signal to said means for controlling.

48. The electronic circuit according to claim 47, further comprising means for generating positive feedback for said comparator circuit whereby said means for initialization has a hysteresis effect in its operating characteristic.

49. The electronic circuit according to claim 20, further comprising a power transformer coupled in circuit with said means for inverting and said load circuit for delivering power at said higher frequency to said load circuit and wherein said means for providing a reactance circuit is a leakage inductance of said power transformer.

50. The electronic circuit according to claim 20, further comprising an electromagnetic interference filter circuit receiving said input power and coupled to said means for generating a source voltage for providing high frequency isolation between the electronic circuit and input power lines.

51. The electronic circuit according to claim 20, further including a low voltage supply circuit for said means for controlling, said low voltage supply circuit receiving power from said means for generating a source voltage having a series resistance for effecting a drop in voltage between said means for generating a source voltage and the output of said lower voltage supply circuit.

52. The electronic circuit according to claim 20, wherein said first and second means for switching are connected in series having a first junction between them and wherein said load circuit includes a transformer having first and second primary windings having a second junction between them and wherein said means for generating a source voltage is connected between said first and second junctions, said first and second primary windings being in series with each other and in parallel with said series-connected first and second means for switching; said means for switching being operated in push-pull relation.

53. The electronic circuit according to claim 20, wherein said first and second means for switching are connected in series having a first junction between them and said means for generating a source voltage connected across said series-connected first and second means for switching; and further comprising first and second capacitors connected in series with each other and to provide a second junction between them and connected in parallel with said parallel-connected first and second means for switching; and wherein said load circuit is connected between said first and second junctions.

54. An electronic circuit for receiving input electrical power at a lower frequency for energizing a load circuit at higher frequency comprising:
voltage source means receiving said input electrical power for generating a source voltage having a varying magnitude and a predetermined minimum voltage, said voltage source means having rectifier circuit means for generating a full-wave rectified voltage and make-up power means receiving power from said full-wave rectified voltage for storing energy for use during periods when the output voltage of said rectifier circuit means falls below said predetermined minimum voltage;
inverter circuit means including first and second switching means connected in circuit with said voltage source means and said load circuit;
logic circuit means responsive to a sensed signal representing current flowing in said switching means for operating said first and second switching means to conduct alternately by switching a conducting one of said switching means to a non-conducting state when the current flowing therein reaches a predetermined value and immediately thereafter switching the other of said switching means to conduct until the current flowing therein reaches a predetermined value, whereby the frequency of current in said load circuit varies as the magnitude of said source voltage varies, said logic circuit means having a bistable circuit having complementary outputs for determining the states of said first and second switching means respectively, sensing circuit means for generating said sensed current signal representative of the instantaneous current flowing through said switching means, and first comparator circuit means receiving said sensed signal for changing the state of said bistable circuit means when said sensed current reaches a predetermined set point signal representative of a desired current level flowing in said switching means;
reactance circuit means connected in circuit with said load circuit, the operating frequency range of said inverter circuit means and the impedance of said reactance circuit means being such that as the magnitude of said source voltage changes the operating frequency of said inverter circuit means changes and the resulting impedance of said reactance circuit means is such that the peak amplitude of current in said load circuit remains substantially constant;
said load circuit having a power transformer coupled in circuit with said voltage source means and said first and second switching means, whereby said sensed current signal is a ramp signal having a rise time slope which increases when the magnitude of said source voltage increases and which decreases when the magnitude of said source voltage decreases, thereby to change the operating frequency of said inverter circuit means; and first compensating circuit means for adding a first compensating signal to said sensed signal when the amplitude of the voltage of said voltage source means is relatively high, thereby at least partially to compensate for current overshoot in the shutting off of said first and second switching means.

55. The electronic circuit according to claim 54, further comprising second compensating circuit means responsive to the charging of said make-up voltage source means for adding a second compensating signal to said sensed signal to increase the conduction time of said switching means when input power is being tapped to charge said make-up voltage source means.

56. The electronic circuit according to claim 55, further comprising minimum frequency oscillator circuit means connected in circuit with said inverter circuit means and responsive to the operation thereof for operating said inverter circuit means if said inverter circuit means does not switch within a predetermined maximum time period, whereby said minimum frequency oscillator circuit means will continue to operate said inverter circuit means at a minimum frequency in the absence of said sensed current signal; timing circuit means for determining the operating frequency of said minimum frequency oscillator circuit means; and third compensating circuit means for modifying said timing circuit means to increase the frequency of said minimum frequency oscillator circuit means when the magnitude of said source voltage increases.

* * * * *